(12) United States Patent
Weintroub et al.

(10) Patent No.: US 7,280,149 B2
(45) Date of Patent: Oct. 9, 2007

(54) METHOD AND APPARATUS FOR DETECTING OPTIMUM LENS FOCUS POSITION (75) Inventors: Jonathan Weintroub, Cambridge, MA (US); Michael D. Aronson, Lexington, MA (US); Ellen B. Cargill, Norfolk, MA (US)

(73) Assignee: Flextronics Sales & Marketing (A-P) Ltd., Port Louis (MU)

( * ) Notice: Subject to any disclaimer, the term of this patent is extended or adjusted under 35 U.S.C. 154(b) by 575 days.

(21) Appl. No.: 10/034,295

(22) Filed: Dec. 21, 2001

(65) Prior Publication Data
US 2003/0117514 A1 Jun. 26, 2003

(51) Int. Cl.
H04N 5/232 (2006.01)
G03B 13/00 (2006.01)

(52) U.S. Cl. ...................... 348/349; 348/345
(58) Field of Classification Search .......... 348/345, 348/346, 347, 348, 349, 353, 354, 135, 139; 396/72, 73, 75, 79, 80, 81, 82, 87, 89, 90, 396/91, 92; 358/906
See application file for complete search history.

(56) References Cited
U.S. PATENT DOCUMENTS

| | | | | |
|---|---|---|---|---|
| 5,065,246 A * | 11/1991 | Takemoto et al. | ........ | 348/354 |
| 5,138,360 A * | 8/1992 | Yamasaki | ........ | 396/104 |
| 5,835,143 A | 11/1998 | Kakiuchi | | |
| 6,034,727 A | 3/2000 | Ito et al. | | |
| 6,075,945 A | 6/2000 | Akiike | | |
| 6,157,783 A | 12/2000 | Ide | | |
| 6,487,366 B1 * | 11/2002 | Morimoto et al. | ........ | 386/117 |
| 6,798,447 B1 * | 9/2004 | Katsuki | ........ | 348/208.12 |
| 2001/0016084 A1 * | 8/2001 | Pollard et al. | ........ | 382/317 |
| 2002/0006281 A1 * | 1/2002 | Owada | ........ | 396/104 |
| 2002/0057847 A1 * | 5/2002 | Hayashi et al. | ........ | 382/282 |
| 2002/0141658 A1 * | 10/2002 | Novak | ........ | 382/282 |

OTHER PUBLICATIONS

"Autofocus and focus maintenance methods", pp. 186-199.

* cited by examiner

Primary Examiner—Vivek Srivastava
Assistant Examiner—Nelson D. Hernandez
(74) Attorney, Agent, or Firm—Daly, Crowley, Mofford & Durkee, LLP (57) ABSTRACT The present invention is a technique for measuring optimum focus position of a lens to include the steps of capturing a digital image in the field of view, digitally compressing the image to provide a compressed file having a file size and providing a focus accuracy parameter derived from the file size of the compressed file. The key point of this invention is the recognition that the compressed file associated with a given image increases monotonically in size as the image is brought into focus. The latter occurs because a focused image has greater information content than an unfocused image. With such a technique, an optimal focus position of a lens can be determined by maximizing a single parameter, the compressed output file size.

17 Claims, 7 Drawing Sheets

METHOD AND APPARATUS FOR DETECTING OPTIMUM LENS FOCUS POSITION

CROSS-REFERENCE TO RELATED APPLICATIONS

Not applicable.

STATEMENTS REGARDING FEDERALLY SPONSORED RESEARCH

Not applicable.

FIELD OF THE INVENTION

This invention relates to focus measurement methods using the information content of captured images.

BACKGROUND OF THE INVENTION

In any optical system it is desirable for the lens to be focused to obtain an optimum image. It is often difficult for a camera operator to determine a precise lens focus position by viewing a scene through a view finder. Focus measurement techniques are often implemented to aid the camera operator to focus the lens to improve the quality of pictures. Focusing is the adjustment of the relative position of the subject, the lens, and the image plane in order to create a sharp image. The distance from lens to image plane depends on the distance from subject to lens.

Autofocus cameras are an important application of focus measurement methods. One type of autofocus system uses a form of sound ranging to bounce a sound wave off the subject. An ultra-high frequency sound emitter is used to transmit a signal and then a receiver listens for the echo. The amount of time it took for the reflected ultrasonic sound wave to reach the camera from the subject is computed and the lens position is adjusted accordingly. The use of sound has its limitations, for example, if you try to take a picture from inside a vehicle with the windows closed, the sound waves will bounce off the window instead of the subject and focus the lens incorrectly.

Another type of autofocus system uses pulsed infrared light and measures the intensity of the reflected light to judge the distance. Alternatively, the pulses of infrared light are transmitted and the subject reflects the infrared light back to the camera. The camera's microprocessor computes the time difference between the time outbound infrared light pulses are sent and the inbound pulses are received. Using the difference, the microprocessor circuit drives the focus motor a particular direction and distance. The use of infrared has its limitations, for example, a source of infrared light from the subject, for example birthday cake candles, can confuse the infrared sensor. A subject surface may absorb the outbound infrared beam. Furthermore, the infrared beam can reflect from objects in the scene that are not the subject of the photograph.

Still another type of autofocus system, sometimes referred to as passive autofocus and commonly found on single-lens reflex (SLR) autofocus cameras, determines the distance to the subject by computer analysis of the image. A typical autofocus sensor is a charge-coupled-device (CCD) that provides input to algorithms that compute the contrast of the actual picture elements. Light from the scene hits the strip of CCDs, each CCD corresponding to a pixel and the microprocessor looks at the values from each pixel. The microprocessor in the camera looks at the strip of pixels and looks at the difference in intensity among the adjacent pixels. If the scene is out of focus, the blurriness you see in the top image causes adjacent pixels to have very similar intensities. The microprocessor sends a signal to a motor that moves the lens. The microprocessor then searches for the point where there is maximum intensity difference between adjacent pixels which is the point of best focus. Passive autofocus must have light and image contrast in order to perform effectively.

A disadvantage of all of the above techniques is that they require additional hardware increasing the costs and size of the camera.

SUMMARY OF THE INVENTION

In accordance with the present invention, a method of measuring optimum lens focus position includes the steps of capturing a first digital image in the field of view, digitally compressing the image to provide a compressed file having a file size and providing a focus accuracy parameter derived from the file size of the compressed file. The advantage of this invention is the recognition that the compressed file associated with a given image increases monotonically in size as the image is brought into focus. This occurs because a focused image has greater information content. Hence, a simple focus accuracy parameter can be extracted from a compressed image and the problem of determining optimal focus position reduces to maximizing a single parameter, the compressed output file size. Although the compression algorithm itself could be fairly complex, it is processing which is very often already available in digital imaging systems, and the additional cost to add this focus detection capability is negligable. The technique is also sensitive to small changes in subject focus. It is also insensitive to ambient lighting levels, and the scene being imaged. This invention works in particular with Joint Photographic Experts Group (JPEG) compression, although any compression algorithm may be used.

An important application of focus measurement is autofocus. In one embodiment, a digital image is captured and compressed and the focus index is extracted from the compressed file. Next the lens is moved to another position and a second image is captured, digitally compressed and the focus index is once again computed. The focus index of the first image is compared with that of the second image and the lens is moved in the direction of the position providing the larger file size. The process is repeated passing through the point of maximum file size and reversing until the point of maximum file size is located where the lens is fixed for capturing an image to save. Also, binary search or any other function maximization algorithm can be used to find the maximum. With such an arrangement, a lens can be quickly focused without the need for additional elements used in known focusing techniques.

In accordance with a further aspect of the present invention, a lens focusing system includes a lens in a field of view of an image detector, a motor to move the lens and an image compression engine, responsive to the image detector, to provide a compressed data file indicative of the field of view. A digital processor compares the size of each compressed data file and provides a control signal to the motor to move the lens to a position that creates the largest compressed data file. With such an arrangement, a focusing system can be added to a digital camera with minimal additional costs.

In accordance with still a further aspect of the present invention, an automatic focusing system for a camera includes a lens, a driver that drives said lens along an optical axis of said lens and a detector that receives an optical image through said lens and outputs signals indicative of said received optical image at an instant of time. The system further includes a processor that processes said signals to provide a digital signal indicative of the optical image and to compress said digital signal to provide a compressed digital signal to provide a size signal indicative of the size of the compressed digital signal and a controller that controls said driver to locate said lens at a position where said size signal becomes greatest.

In accordance with still a further aspect of the present invention, a method of locating a lens in a unit under test includes the steps of placing a test target a fixed distance from the unit under test, moving the lens to one of a plurality of positions and capturing through the lens and digitally compressing a digital image of the test target to provide a compressed image file having a file size, moving the lens to another one of a plurality of positions and capturing through the lens and digitally compressing a digital image of the test target to provide a compressed image file having a file size until the file size is maximized and fixing the lens within the unit under test at the position that provides the maximum file size. With such a technique, a lens can be accurately and quickly placed within a camera or sensor with minimal human error.

In accordance with still a further aspect of the present invention, a method of locating a sensor relative to a lens in a unit under test includes the steps of replicating a test target over regions of an object plane as it passes through the lens, capturing an image of the test target with the sensor and segmenting the image into regions corresponding to the regions of the object plane and compressing a digital image corresponding to each region and recording the relative size of the compressed image for each region, and adjusting the location of the sensor relative to the lens to set axial and tilt adjustments such that the relative size of the compressed image for each region is maximized. With such a technique, a lens can be accurately and quickly placed relative to the detector within a camera or sensor with minimal human error.

In accordance with still a further aspect of the present invention, a range finder includes a lens having a plurality of predetermined positions with corresponding ranges, a driver that drives said lens along an optical axis of said lens and a detector that receives an optical image through said lens and outputting signals indicative of said received optical image at an instant of time. The range finder further includes a processor that processes said signals to provide a digital signal indicative of the optical image and to compress said digital signal to provide a compressed digital signal to provide a size signal indicative of the size of the compressed digital signal and a controller that controls said driver to locate said lens at a position where said size signal becomes greatest, said position corresponding to a specific range. With such an arrangement, an optical system can provide range information without having to add additional elements used in known range finding systems.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Before providing a detailed description of the invention, it may be helpful to review the state of the art of digital cameras or sensors. It is typical for digital images to be captured and processed by a compression algorithm, such as, for example, a JPEG algorithm or any other compression format, to minimize the space needed to store the image, or the band width needed to transmit the image. Image compression algorithms take advantage of the redundancy of information in digital images to reduce the size of the files needed to store the data. Typically, the size of the compressed image file changes dynamically depending on the subject matter, because simple images are capable of being represented by relatively few bits of information, while complex images require more bits to represent them.

The key observation which led to the present invention is that the compressed file associated with a given image increases monotonically in size as the image is brought into focus. The latter occurs because a focused image has greater information content than an unfocused image. Thus the problem of autonomously focusing a digital image reduces to maximizing a single parameter, the file size of the compressed output file. Although the compression algorithm itself may be fairly complex, it is processing which is very often already available in typical digital cameras and the marginal cost to add the contemplated focusing technique is then very small. The technique is very sensitive to small changes in the focus of the image and works well with existing Joint Photographic Experts Group (JPEG) compression formats as well as other formats including Lempel Ziv Welch (LZW) data compression format, CMP compression format, Set Partitioning in Hierarchical Trees (SPIHT) compression format and wavelet based image compressing techniques such as Embedded Zerotree Wavelet (EZW) Compression format and the Wavelet Image File (WIF) compression format or any other compression technique.

Thus the present invention is a method of measuring optimum focus position of a lens to include the steps of capturing a first digital image in a field of view, digitally compressing the image to provide a compressed file having a file size and providing a focus accuracy parameter derived from the file size of the compressed file. With such a technique, a parameter indicative of the information content as indicated by the file size of a compressed file can be provided which in turn can be used with other system parameters as required. For example, the focus accuracy parameter can be used to move a lens a predetermined amount to bring the lens to focus or determine the range to an object in the field of view as described further in connection with FIG. 6.

Figure 1:
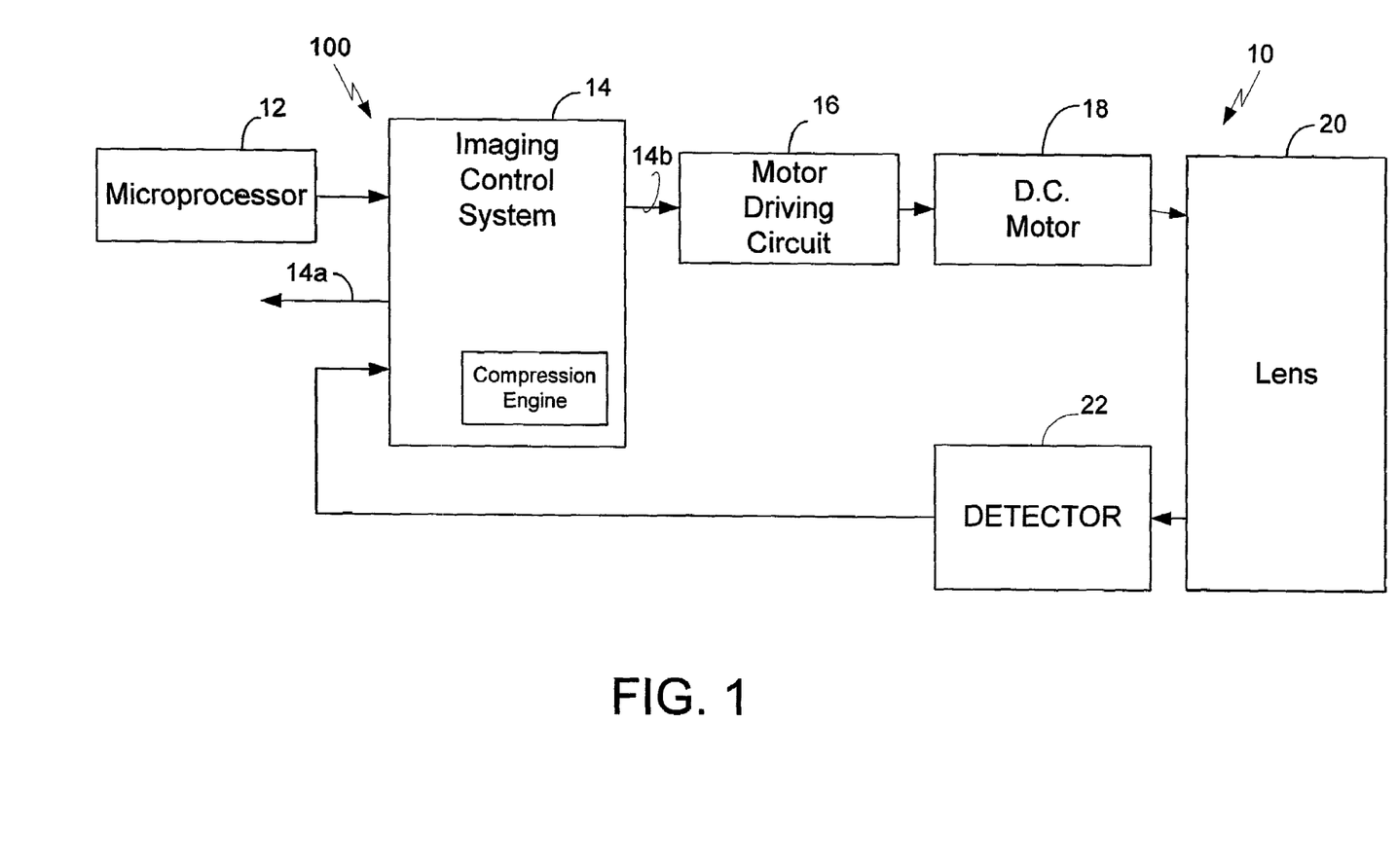
FIG. 1 is a block diagram of a focusing system according to the invention.

Referring now to FIG. 1, a system 100 is shown to include a detector 22 with a lens 20 disposed in the field of view of the detector 22 and a focusing system 10. The lens 20 is a typical lens used in digital cameras and is know to one skilled in the art. The detector 22 is an image sensor and in one embodiment is an array of CCDs capable of detecting images and providing a digital signal indicative of the image in the field of view of the detector 22. Although in the present embodiment and the alternative embodiments described hereinafter, an array of CCDs are described, it should be apparent that any image sensor can be used including Complementary Metal-Oxide-Silicon (CMOS), Charge-Injected-Device (CID) or Infrared (IR) sensors. The system 100 also includes a microprocessor 12 which includes a compression engine and other processing steps 14 (hereinafter also referred to as controller 14) which provides a compressed digital image data file at an output port 14a as well as control the operation of the system 100 and the focusing system 10. The focusing system 10 includes the controller 14 having a control output 14b which is fed to a motor driving circuit 16 that controls a D.C. motor 18. The D.C. motor 18 is a stepping motor which is capable of moving lens 20 to one of many focus positions as to be described.

In operation, the method of focusing a lens 20 includes the steps of capturing a first digital image in the field of view and digitally compressing and storing the size of the compressed data file. Next the lens 20 is moved to another position and a second image is captured and digitally compressed and the size of that compressed data file is stored. Next, the size of the data file of the first image is compared with the size of the data file of the second image and the lens 20 is moved in the direction of the position providing the larger file size. The process is repeated until moving the lens 20 no longer results in a larger file size where the lens 20 is fixed for capturing an image to save. The digitally compressing step can include using various compression techniques including the Joint Photographic Experts Group (JPEG) compression format, LZW (Lempel Ziv Welch) data compression format, CMP compression format, Set Partitioning in Hierarchical Trees (SPIHT) compression format and wavelet based image compressing techniques such as Embedded Zerotree Wavelet (EZW) Compression format and the Wavelet Image File (WIF) compression format as well as other formats. It should be appreciated damping techniques are incorporated in the moving algorithm so the lens 20 is moved to an optimum position. It should also be appreciated, depending on the application, at times it may be desirable to capture only a portion of the image in the field of view of the lens 20, for example the center portion, a corner portion or a user selectable portion, and compress only that portion of the image into the compressed data file. As long as the same portion is used through out the process, the process as describe is applicable to a portion of the image as well as the entire image. Alternatively, the system 100 can operated in other manners as described further hereinafter.

Figure 2:
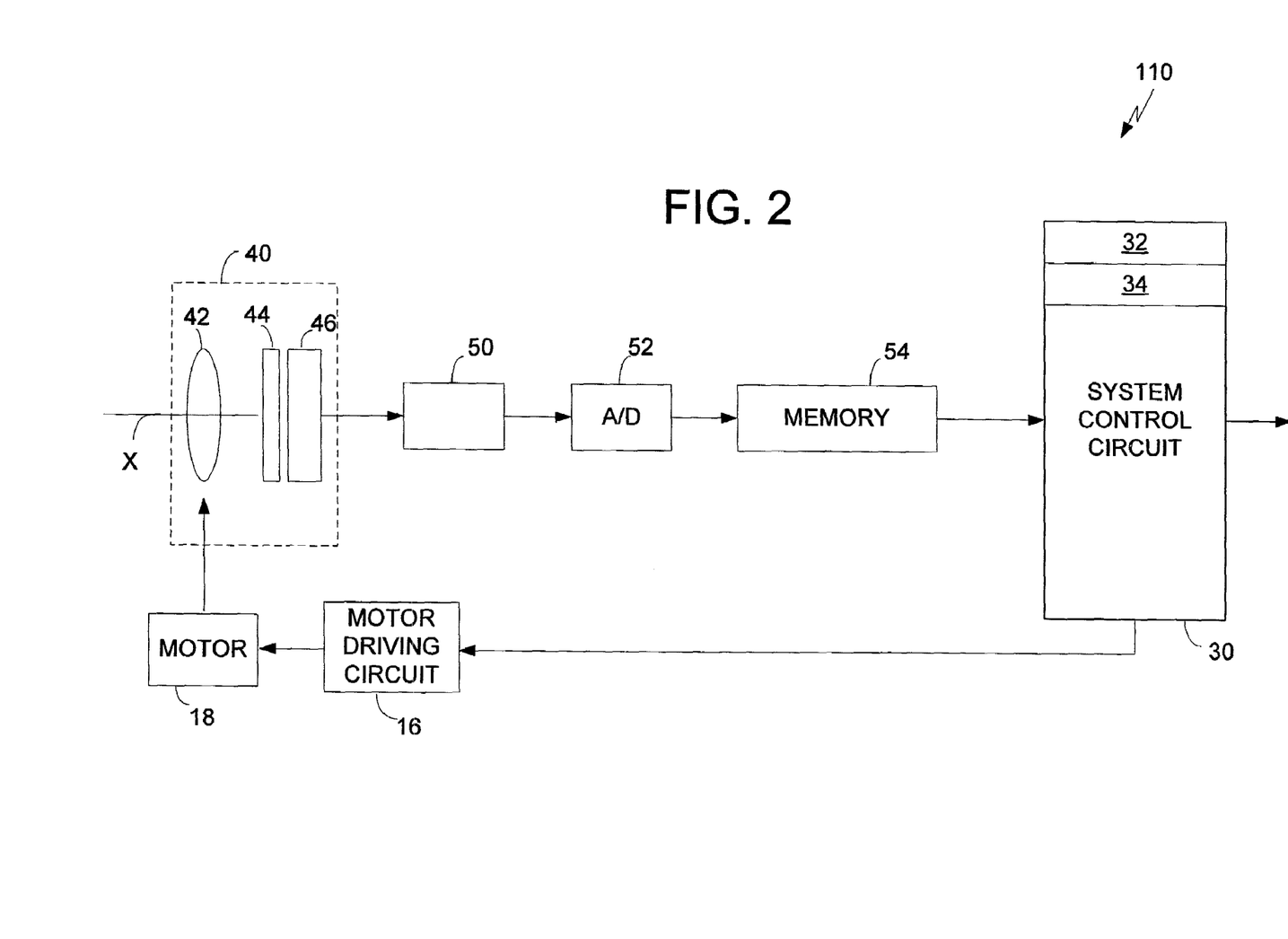
FIG. 2 is a more detailed block diagram of an autofocus system according to the invention.

Referring now to FIG. 2, an autofocus system 110 is shown to include a system control circuit 30 having a microcomputer 32 which controls the operation of the autofocus system 110. The system control circuit 30 additionally includes memory 34 which includes application instructions stored in said memory 34 to control the operation of the microcomputer 32 and to provide the requisite control signals to the autofocus system 110. The application instructions include a compression algorithm to compress the digital data in memory 54 to minimize the memory space needed to store the image in memory 34. It should be appreciated that memory 34 and memory 54 can be common memory or separate memory depending upon the application environment. The compression algorithm can be a JPEG algorithm or can use any of the various compression techniques described above. The system control circuit 30 controls a motor driving circuit 16, thereby driving a motor 18 to move a photographing lens 42 along a photographing axis X. By changing the position of the lens 42, an in-focus picture of an object to be photographed can be taken. The system control circuit 30 is typically connected to a release button (not shown) which actuates an automatic focusing (AF) operation and releases a shutter (not shown). An image of the object is formed on the CCD 46 after filtering is accomplished by filter 44. The filter 44 is a complementary color filter which includes magenta (Mg), yellow(Ye), and Cyan(Cy) pixels where each pixel of the filter 46 corresponds to a pixel of the CCD 46. The CCD 46.outputs a signal corresponding to the image, to a correlation double sampling (CDS) circuit 50, where processing, such as the removal of reset noise, is accomplished. The signal is then converted by A/D converter 52. Therefore, the output of the A/D converter 52 represents digital signals corresponding to each of the three colors of the filter 44. Each digital signal is stored in memory 54. These digital signals are then processed by the system controller 30 to provide an Autofocus (AF) signal. According to this AF signal, a motor driving circuit 16 is controlled to drive a motor 18 and the lens 42 is moved such that an in-focus image is obtained. As described above, in operation, the method of focusing the lens 42 includes the steps of capturing a first digital image in the field of view and digitally compressing and storing the size of the data file in memory 34. Next the lens 42 is moved to another position and a second image is captured and digitally compressed and the size of the data file is stored in memory 34. Next, the size of the data file of the first image is compared with the size of the data file of the second image and the lens 42 is moved in the direction of the position providing the larger file size. The process is repeated until moving the lens 42 no longer results in a larger file size where the lens 42 is positioned for capturing an image to save.

It should be appreciated that the above described technique can be used in an apparatus for setting the focus position of a lens in a manufacturing environment. For example, with low cost cameras, the position of the lens relative to the photosensitive detector is fixed and set to provide best focus at one subject distance. The range of subject distances that result in an acceptable photograph is determined by the focal length of the lens, the size of the aperture, the inherent optical performance of the lens, and the fixed subject distance chosen. For low cost cameras, typically the tolerance stack associated with the position of the lens' principal planes and the mechanical assembly is such that the position of best focus for the lens is variable from unit to unit. In order to set the focus position in a low cost manufacturing environment, operators view an image of a test target on a video monitor, and adjust the position of the lens until the video image appears to be sharp. Once this "best focus" position has been identified, the operator fixes the lens position using an adhesive or fastener. Most often, this process is not reversible. This technique, while easy to implement in a low labor cost environment, provides variable results due to the operator's vision, fatigue level, understanding of the process, and the quality of the display used. The yield and overall quality of this approach is frequently less than desirable adding additional costs to the process. Using the present invention, a parameter indicative of the information content as indicated by the file size of a compressed file can be provided which in turn can be used to set the lens location in manufacturing.

Figure 3:
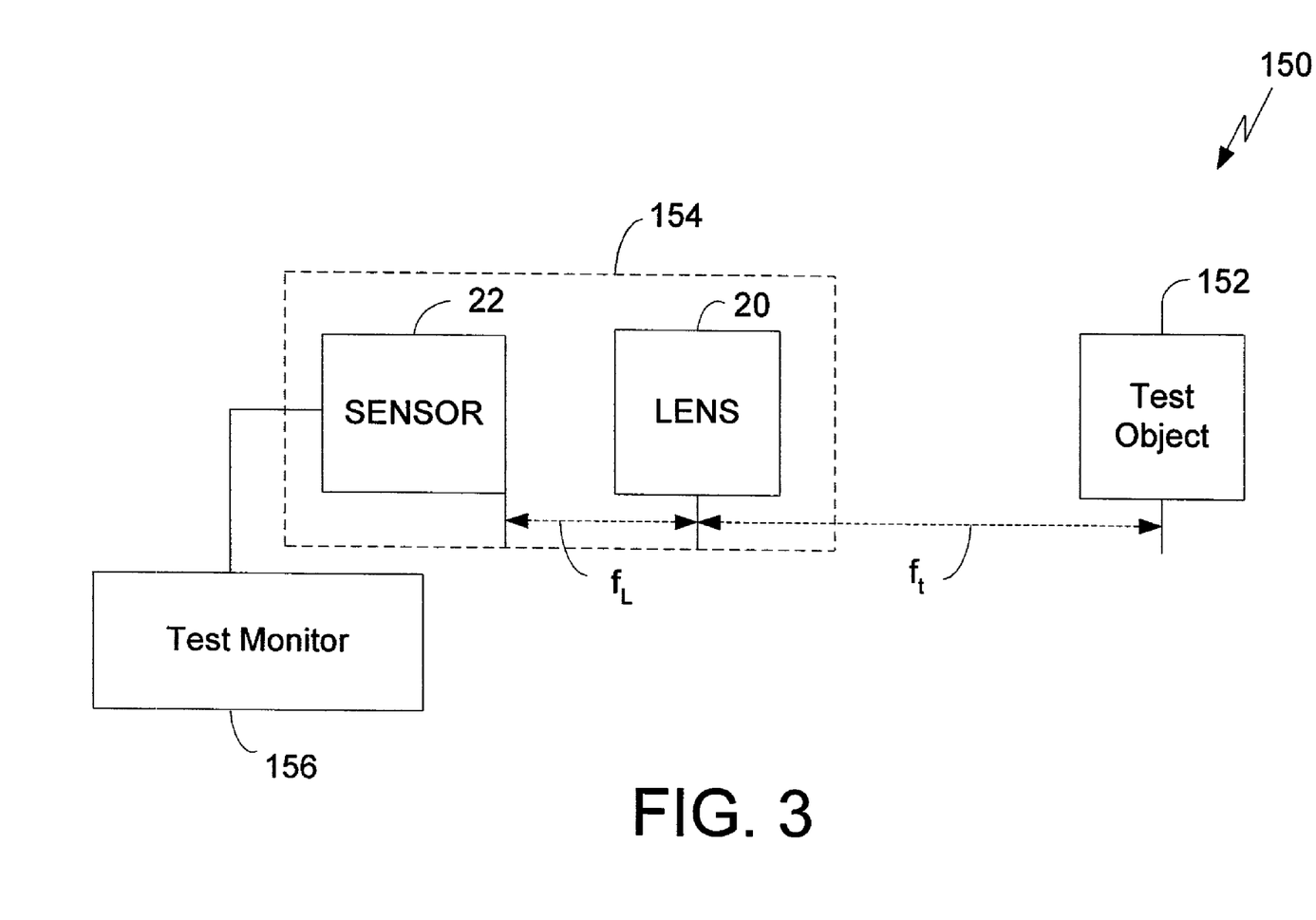
FIG. 3 is a block diagram of an alternative embodiment according to the invention.

Referring now to FIG. 3, a new technique is shown to set the position of best focus based on measuring the information content of the image. In this embodiment, using a test system 150, a test target 152 is placed a fixed distance, $f_t$, from a camera or unit under test 154 corresponding to the optimized subject distance of the fixed-focus design that will yield the best overall depth of field for the camera application. An operator manually adjusts the focus position, $f_1$, of the lens. The camera 154 continually captures images with sensor or detector 22 of the test target 152 and compresses the image. The file size of the compressed image file is measured and compared to the size of previous image files using test monitor 156. As the image file becomes larger, the lens 20 is approaching a position of better focus. As the image file becomes smaller, the lens 20 is approaching a position of poorer focus. The file size data is provided to the operator by test monitor 156 to inform the operator of the file size and trend. This could be a numerical number or alternatively, for example, a sequence of audible tones of differing frequencies could be emitted at regular intervals to alert the operator of the relative change in focus position, or a graphical display could be utilized to indicate the relative file sizes. After adjusting the lens 20 through focus, the operator would be easily able to discern the position of best focus from the display. The lens would then be fixed in the best focus position.

The technique of determining the position of best focus utilizing the information content of the image offers several advantages. First, it is not operator dependent. It does not require the use of a visual display of image data, resulting in a potential cost saving to the manufacturing line. The method is not dependent on the performance of a video display. The method is simple to teach and use and does not require complicated operator training. Furthermore, this method can be implemented without human intervention.

Figure 4:
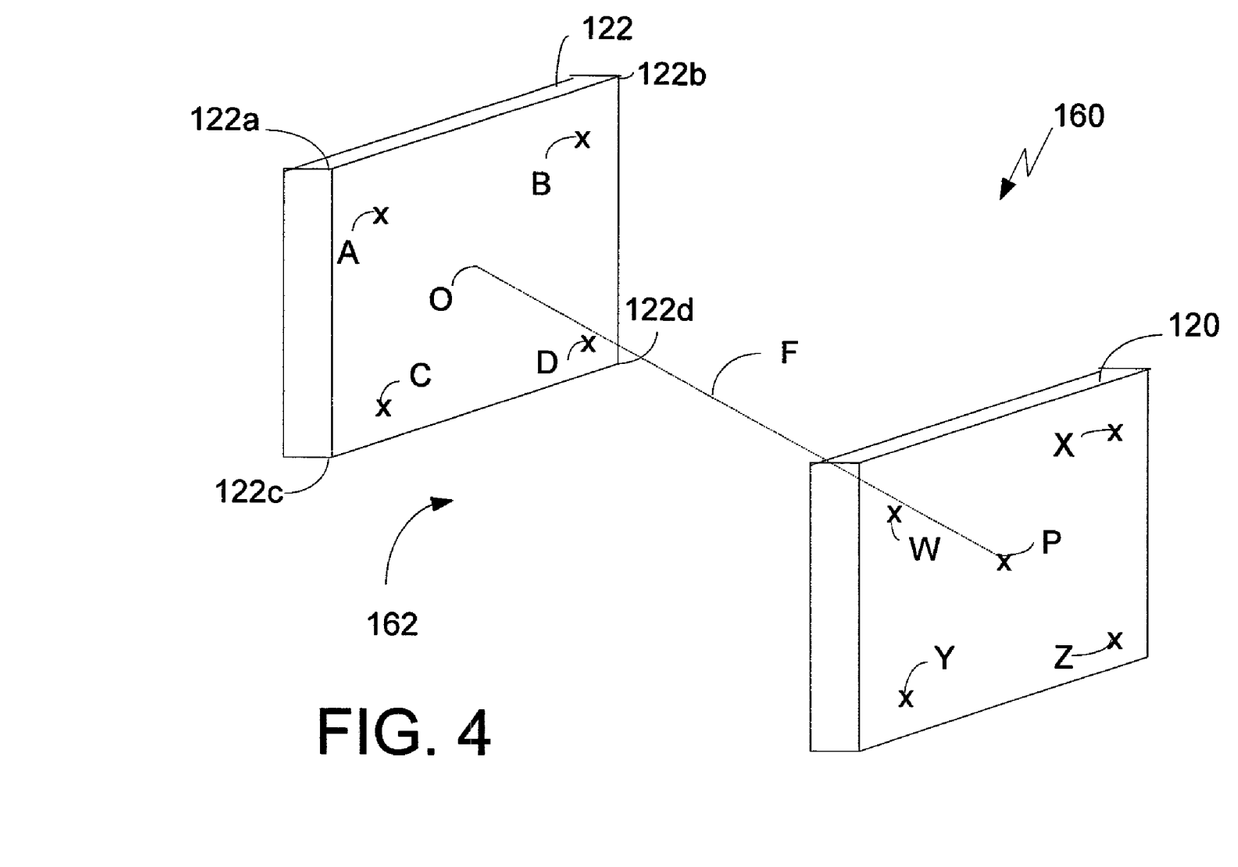
FIG. 4 is a block diagram of still another embodiment according to the invention.

Referring now to FIG. 4, an apparatus 160 for setting the position of an imaging sensor 122 relative to an optical system 120 in a manufacturing environment is shown. The manufacture of high quality digital cameras 162 requires a precise positioning of the image sensor 122 relative to the principal planes of the optics 120. More specifically, the on-axis position, O, of the center of the sensor relative to the lens is adjusted. Then the position of the four corners, $122_a$, $122_b$, $122_c$, and $122_d$ of the sensor 122 need to be sensed and the tilt of the sensor adjusted so that the image is in focus over the entire sensor plane. The sensing of focus over the image plane is generally a cumbersome procedure and employs techniques such as a Hartmann screen to create an array of images over the plane of the sensor. Techniques are utilized to estimate relative focus by measuring the centroid of imaged spots of off-axis positions. This requires dedicated instrumentation and an optical bench to support the testing.

Using the inventive method whereby a test target (not shown) is replicated over the corners, W, X, Y and Z and the center P of the object plane as it passes through the lens 120, a single image is made of the replicated test target. The image is segmented into regions and compression is performed on each of the regions. As the sensor 122 is adjusted, the relative size of the compressed image as captured by sensor 122 is measured for each region A, B, C, D and the center O. The simultaneous change in file size for each region A, B, C, D and the center O is used to drive axial and tilt adjustments. This method eliminates specialized equipment to create off-axis images. It also eliminates the computations required to estimate the relative focus of images over the image plane. It should be appreciated by monitoring the file size for each region of the sensor 122, the sensor 122 can be positioned relative to the lens 120 such that the plane of the sensor 122 is parallel to the plane of the lens 120 taking into account aberrations located in the lens 120. Using a test monitor, as shown in FIG. 3, indicating the file size of the various regions, an operator can position the lens 120 relative to the sensor 122 including positioning the four corners of the sensor 122 relative to the four corners of the lens 120.

Figure 5:
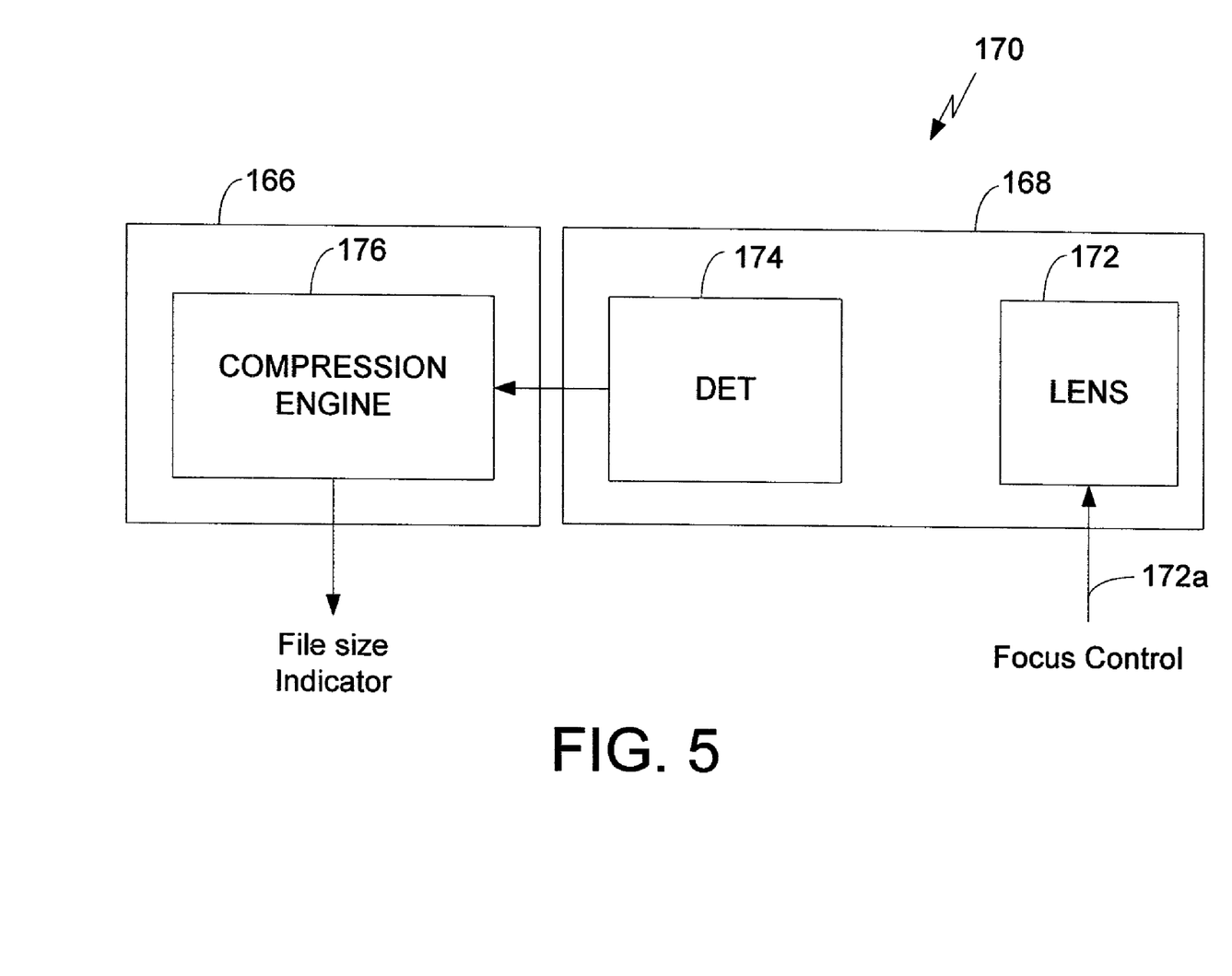
FIG. 5 is a block diagram of a focusing system according to the invention.

In still another embodiment, referring now to FIG. 5, the contemplated focusing technique can be used with a focusing system 170 with a tethered camera 168 in a personal computer application to assist with the manual adjustment of a lens 172 for setting the best focus position in the users environment. There is a category of low-cost digital video cameras that operate only while connected to a personal computer 166. These products are typically equipped with screw-mount manual focus lenses 172. The focus position of the lens is adjusted using a focus control 172a manually by the user who judges the position of best focus based on the appearance of the image displayed on a personal computer (PC) display. Given the time delay between when the user actuates a change in focus position of the lens, and the time that the image is displayed, it can be an iterative and somewhat frustrating process. Using the present invention, the streaming video file size is measured while the user is adjusting the focus position of the lens 172. While the size of the compressed file is decreasing an audible tone of a given frequency is emitted. When the file size begins to increase again, a different tone is emitted, alerting the user that the position of best focus has been passed. The user then fixes the position of focus based on the position of the maximum file size using audible feedback. It should be appreciated as described above, alternatively a bar chart or some other visual display can be used to show the relative size of the video file as the focus is varied.

Figure 6:
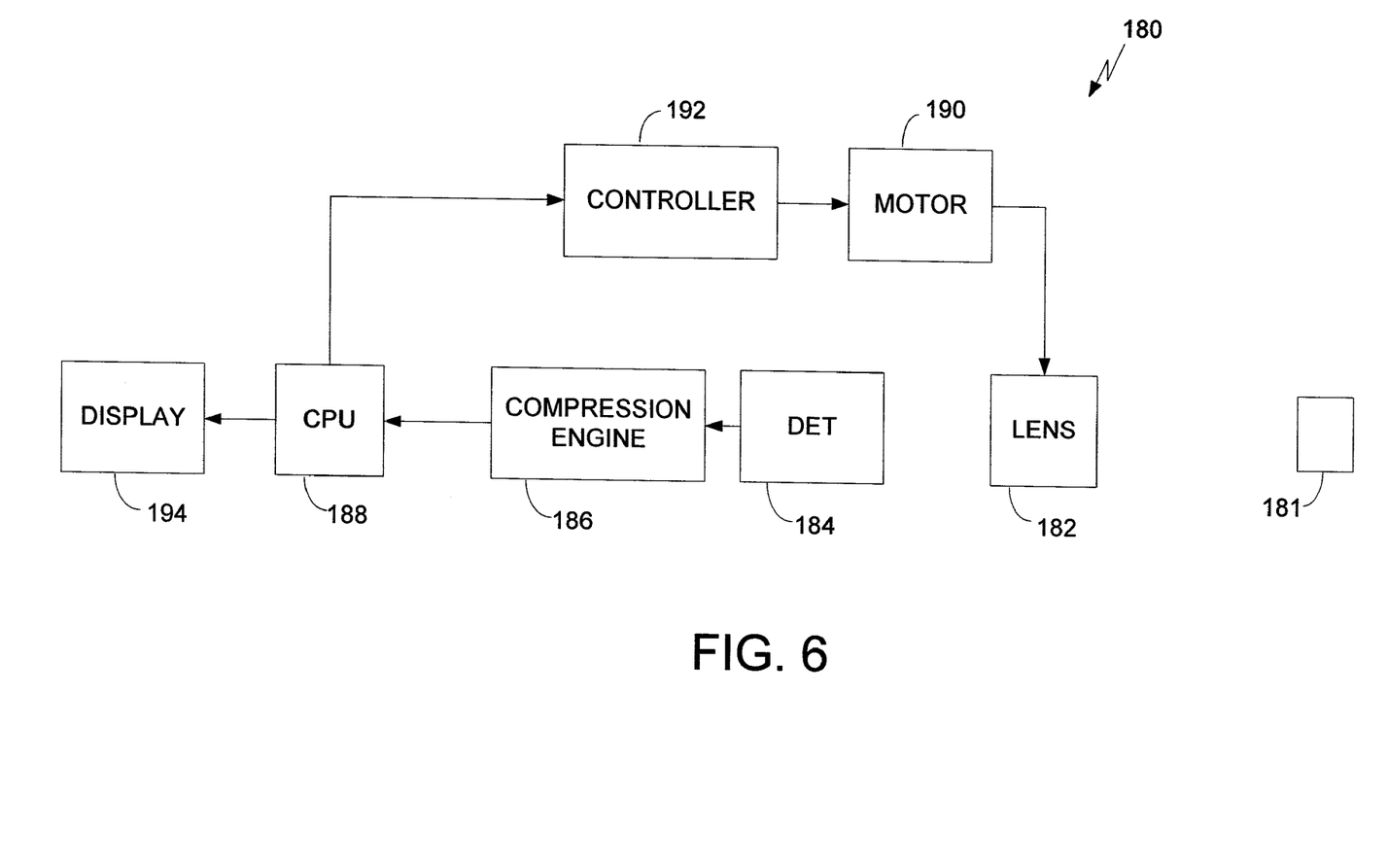
FIG. 6 is a block diagram of a range finder using the technique according to the invention.

Referring now to FIG. 6, a handheld rangefinder 180 that estimates object distance by moving a narrow field of view taking lens 182 to the position of best focus and calculating the distance to an object 181 by means of estimating the conjugates of the optical system is shown. There are a variety of devices that utilize various mechanisms to estimate the distance of an object. Lasers are used for this purpose whereby a beam is emitted, is reflected from an object, and is detected. Sonar is used to measure the time of flight of a sound wave that is reflected from a distant object. In the present invention, a rangefinder 180 having an image sensor 184 and a lens 182 is used to estimate the distance of an object 181. A user points the rangefinder 180 at the object 181 whose distance is to be estimated. The object is imaged and compressed by compression engine 186, and the size of the compressed image file is measured and stored. A stepper motor 190, responsive to a controller 192, is used to move the position of the taking lens 182, and another image is captured, compressed and its file size measured and stored. A microcomputer 188 controls this process and a control signal is provided to the controller 192 to move the lens 182 and continue the process until the position of the lens 182 having the maximum file size is determined. Knowing the position of the lens 182 which can be understood knowing the direction and number of steps that the stepper motor 190 has moved the lens, one can determine the optical conjugate distance, and thereby the object distance can be estimated.

Figure 7:
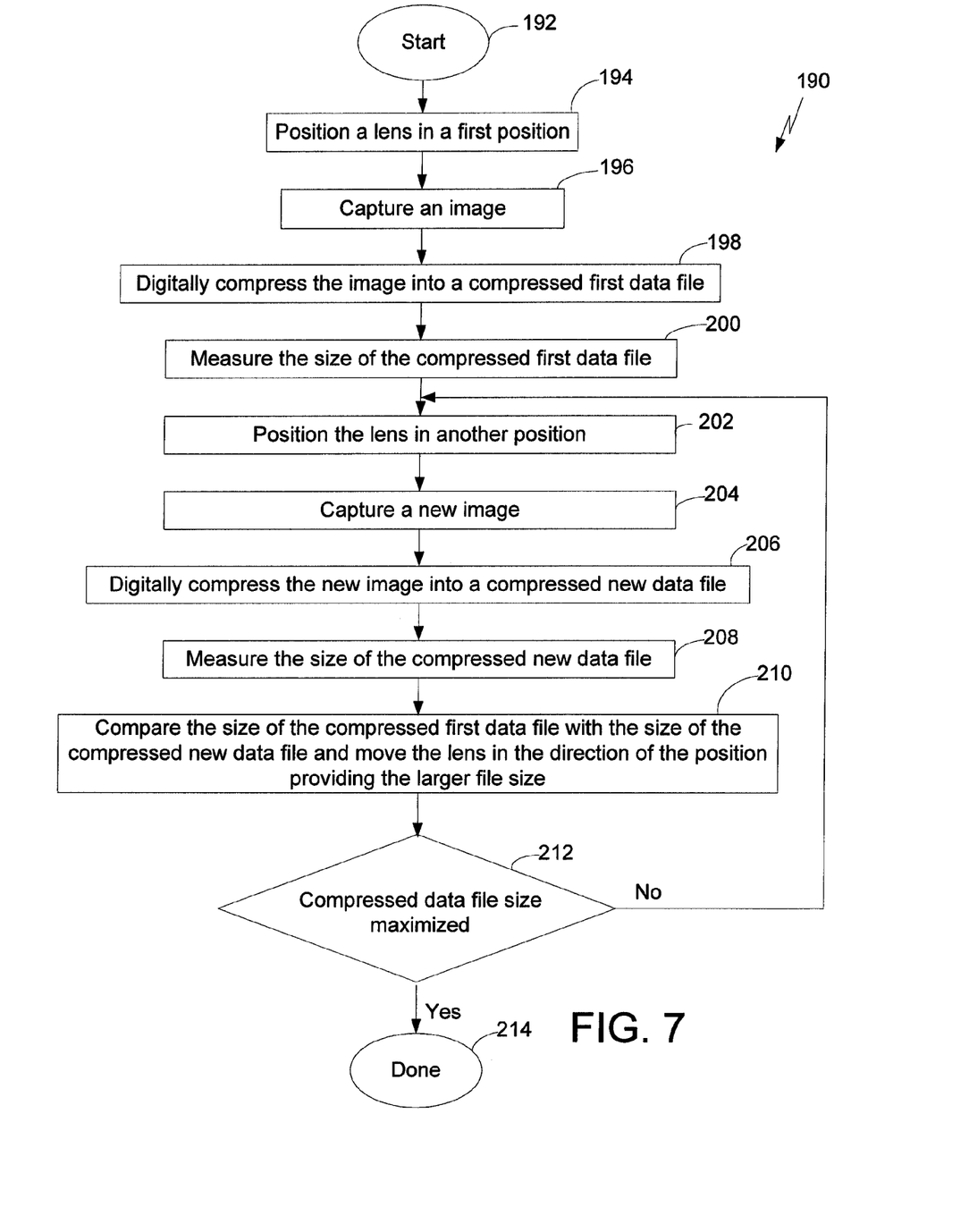
FIG. 7 is a flow diagram illustrating the steps to implement the invention.

FIG. 7 is a flow diagram showing processing steps 190 performed by portions of system 10 (e.g. FIG. 1) to control the operation of the focusing system 10. The rectangular elements (typified by element 194 in FIG. 7), herein denoted "processing blocks," represent computer software instructions or groups of instructions. The diamond shaped elements (typified by element 212 in FIG. 7), herein denoted "decision blocks," represent computer software instructions, or groups of instructions which affect the execution of the computer software instructions represented by the processing blocks. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

To carry out the present invention, the processing steps 190 are performed to cause the microprocessor 12 (FIG. 1) to execute the following instructions. When a focus command is initiated the computer returns to start block 192. A Position a lens in a first position command block 194 is executed where the lens 20 is positioned at a first position. This first position can be a predetermined position set by previous commands or can be an arbitrary position. It should be noted the position of lens 20 is controlled by a D.C. stepping motor 18 having a plurality of predetermined positions depending on the control signal fed to the motor driving circuit 16 by the imaging control system 14. Hence command block 194 causes the motor driving circuit 16 to control motor 18 to move lens 20 to a first position. Once the lens is moved to the first position, a Capture an image command block 196 is executed where the image detector 22 captures an image. A Digitally compress the image into a compressed first data file command block 198 is executed where the image captured by the detector 22 is digitally compressed, using a JPEG compression algorithm or any compression algorithm is acceptable, into a compressed data file. It should be appreciated, depending on the application, at times it may be desirable to capture only a portion of the image in the field of view of the lens 20, for example the center portion, and compress only that portion of the image into the compressed data file. As long as the same portion is used through out the process, the process as describe is applicable to a portion of the image as well as the entire image.

Next, a Measure the size of the compressed first data file command block 200 is executed wherein the size of the compressed data file is obtained and stored in memory. It should be noted that the actual digital image data file is not needed, but only the resulting size of the file. Hence the data file associated with image scene may be discarded. A Position the lens in another position command block 202 is executed which causes the motor driving circuit 16 to control the D.C. stepping motor 18 to move the lens 20 to a new position. Once the lens is moved to the new position, a Capture a new image command block 204 is executed where the image detector 22 captures a new image. A Digitally compress the new image into a compressed new data file command block 206 is executed where the image is again captured by the detector 22 and digitally compressed into a compressed data file. Next, a Measure the size of the compressed new data file command block 206 is executed wherein the size of the compressed data file is obtained and stored in memory. It should be noted that if only a portion of the actual digital image data file is used in step 198, then the same portion is used in step 206. Next a Compare the size of the compressed first data file with the size of the compressed new data file and move the lens in the direction of the position providing the larger file size command block 210 is executed where the size of the first data file is compared to the size of the second data file. The position having the larger data file is known to be more in focused than the position have a smaller data file. If the lens is in the position having the larger file size then the lens is kept stationary, if the lens is in the position having the smaller file size then the lens is moved to the position that has the larger file size. Next a Compressed data file size maximized decision block 212 is executed wherein it is determined if the maximum compressed data file size has been found. If the lens has been positioned through the position with maximum file size and is currently in that position, then the decision block 212 passes the program to Done block 214 as being done. If the position with the maximum compressed data file size has not been found then the decision block 212 passes the program to the Position the lens in another position command block 202 where the lens is moved to a new position beyond the last position it occupied. Blocks 204, 206, 208, 210 and 212 are again executed until the position having the largest file size is located and the program is done.

It should be appreciated the steps associated with FIG. 7 are applicable for each of the embodiments shown in FIGS. 1 through 6 for determining the correct position of the movable lens.

All publications and references cited herein are expressly incorporated herein by reference in their entirety.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

What is claimed is:

1. A method comprising:
    capturing at least a portion of an image in a field of view to provide a digital image;
    digitally compressing the digital image of an image at a first instance of time to provide a compressed file having a file size;
    digitally compressing the digital image of an image at a second instance of time to provide a compressed file having a file size;
    comparing the file size of the compressed files and moving a lens to maximize the size of the compressed file to bring the lens into focus;
    capturing at least a portion of an image in a field of view to provide a third digital image at a third instance of time;
    digitally compressing the third digital image to provide a third compressed file having a file size; and
    comparing the file size of the third compressed file with the previous compressed file to determine which digital image is best focused.

2. The method as recited in claim 1 further comprising: determining, from the comparing the file size step, the range to an object in the image.

3. A lens focusing system comprising:
a lens in a field of view of an image detector
a mechanism to move the lens;
a compression engine, responsive to the image detector, to provide a first compressed data file having a file size at a first instance of time and a second compressed data file having a file size at a second instance of time;
a digital processor to compare the file size of the first and the second compressed data files and to provide a control signal to the mechanism to move the lens in the direction of the position that creates the largest compressed data file; and
wherein the compression engine provides a third compressed data file having a file size at a third instance of time and the digital processor compares the file size of the third compressed data file with the previous compressed data file having the largest file size and provides a control signal to the mechanism to move the lens in the direction of the position providing the larger size to focus the lens.

4. A method of focusing a lens comprising:
(a) capturing a first image and digitally compressing and storing the data;
(b) moving the lens to another position;
(c) capturing a second image and digitally compressing and storing the data;
(d) comparing the size of the data file of the first image with the size of the data file of the second image and moving the lens in the direction of the position providing the larger file size;
(e) capturing a third image and digitally compressing and storing the data; and
(d) comparing the size of the data file of the third image with the size of the data file of the previous image that provided the largest data file and moving the lens in the direction of the position providing the larger file size.

5. An automatic focusing system for a camera comprising:
a lens;
a driver that drives said lens along an optical axis of said lens;
a detector that receives an optical image through said lens and outputting signals indicative of said received optical image at an instance of time;
a processor that processes said signals to provide a first and second digital signal indicative of the respective optical image and to compress said digital signals to provide a respective first and second compressed digital signal, each having a size signal indicative of the size of the respective compressed digital signal; and
a controller that controls said driver to locate said lens at a position where said size signal becomes greatest and wherein the processor provides a third digital signal and compresses said third digital signal to provide a third compressed digital signal and the controller controls the driver to move the lens in the direction of the position providing the largest size signal.

6. The automatic focusing system as recited in claim 5 wherein the size signal is a digital word indicative of the size of the compressed digital image.

7. The automatic focusing system as recited in claim 5 wherein the compressed digital image is a JPEG compressed image.

8. The automatic focusing system as recited in claim 5 wherein said detector comprises a charge coupled device having a plurality of light receiving pixels and color filters provided in front of said light receiving pixels, each of said color filters transmitting one of said plurality of color components.

9. The automatic focusing system as recited in claim 5 wherein said controller that controls said driver to locate said lens where said size signal becomes greatest by moving said lens along the optical axis to a plurality of lens positions and comparing between values of said size signal measured at said lens positions.

10. The automatic focusing system as recited in claim 5 wherein said controller initially moves said lens in a predetermined direction by a predetermined amount.

11. The automatic focusing system as recited in claim 10 wherein said driver moves said lens in a same direction by a calculated amount.

12. The automatic focusing system as recited in claim 5 wherein a numerical function maximizing technique is used to determine the greatest size signal.

13. A method of locating a lens in a unit under test comprising:
placing a test target a fixed distance from the unit under test;
moving the lens to one of a plurality of positions and capturing through the lens and digitally compressing a digital image of the test target to provide a compressed image file having a file size;
moving the lens to another one of a plurality of positions and capturing through the lens and digitally compressing a digital image of the test target to provide a compressed image file having a file size until the file size is maximized;
moving the lens to still another one of a plurality of positions and capturing through the lens and digitally compressing a digital image of the test target to provide a compressed image file having a file size until the file size is maximized; and
fixing the lens within the unit under test at the position that provides the maximum file size to focus the lens.

14. A method of locating a sensor relative to a lens in a unit under test comprising:
replicating a test target over regions of an object plane as it passes through the lens;
capturing an image of the test target with the sensor and segmenting the image into regions corresponding to the regions of the object plane and compressing a digital image corresponding to each region and recording the relative size of the compressed image for each region;
capturing additional images of the test target with the sensor and segmenting the additional images into regions corresponding to the regions of the object plane and successively compressing the digital image corresponding to each region and recording the relative size of the compressed image for each region; and
adjusting the location of the sensor relative to the lens to set axial and tilt adjustments such that the relative size of the compressed image for each region is maximized.

15. A method comprising:
(a) capturing a portion of a first image passing through a lens and digitally compressing and recording the size of the resulting data file;
(b) moving the lens to another position;
(c) capturing a portion of a second image passing through the lens and digitally compressing and recording the size of the resulting data file;

(d) comparing the size of the data file of the first image with the size of the data file of the second image to determine which lens position provides a larger file size;
(e) moving the lens to still another position;
(f) capturing a portion of a third image passing through the lens and digitally compressing and recording the size of the resulting data file; and
(g) comparing the size of the data file of the third image with the size of the data file of the previous image having the largest data file size to determine which lens position provides a larger file size to focus the lens.

16. The method as recited in claim 15 wherein the digitally compressing step utilizes JPEG compression.

17. A range finder comprising:
a lens having a plurality of predetermined positions with corresponding ranges;
a driver that drives said lens along an optical axis of said lens;
a detector that receives an optical image through said lens and outputting signals indicative of said received optical image at an instant of time;
a processor that processes said signals to provide a first and second digital signals indicative of a respective optical image and to compress said signals to provide a first and a second compressed digital signal, each having a respective size signal indicative of the size of the compressed digital signal; and
a controller that controls said driver to move said lens at a position where said size signal becomes greatest wherein said processor provides a third digital signal and compresses said third digital signal to provide a third compressed digital signal having a respective size signal and said controller locates the lens to a position where the size signal is maximized, said position corresponding to a specific range.

* * * * *

UNITED STATES PATENT AND TRADEMARK OFFICE
CERTIFICATE OF CORRECTION

PATENT NO. : 7,280,149 B2
APPLICATION NO. : 10/034295
DATED : October 9, 2007
INVENTOR(S) : Jonathan Weintroub It is certified that error appears in the above-identified patent and that said Letters Patent is hereby corrected as shown below:

Col. 1, line 22, delete "system it" and replace with --system, it--.

Col. 4, lien 23, delete "band width" and replace with --bandwidth--.

Col. 5, line 2, delete "know" and replace with --known--.

Col. 5, line 26, delete "Next the" and replace with --Next, the--.

Col. 5, line 43, delete "appreciated damping" and replace with --appreciated, damping--.

Col. 5, line 51, delete "through out" and replace with --throughout--.

Col. 5, line 53, delete "can operated" and replace with --can be operated--.

Col. 6, line 24-25, delete "Autofocus" and replace with --autofocus--.

Col. 7, line 46, delete "$122_d$ of the sensor 122 need" and replace with --$122_d$, of the sensor 122 needs--.

Col. 8, line 15, delete "users" and replace with --user's--.

Col. 8, line 29, delete "decreasing an" and replace with --decreasing, an--.

Col. 8, line 61, delete "understood knowing" and replace with --understood by knowing--.

Col. 9, line 23, delete "stated the" and replace with --stated, the--.

Col. 9, line 30, delete "initiated the" and replace with --initiated, the--.

Col. 9, line 53, delete "through out" and replace with --throughout--.

Col. 9, line 53, delete "describe" and replace with --described--.

Col. 10, line 9, delete "Next a" and replace with --Next, a--.

Col. 10, line 19, delete "size then" and replace with --size, then--.

UNITED STATES PATENT AND TRADEMARK OFFICE
CERTIFICATE OF CORRECTION

PATENT NO. : 7,280,149 B2
APPLICATION NO. : 10/034295
DATED : October 9, 2007
INVENTOR(S) : Jonathan Weintroub It is certified that error appears in the above-identified patent and that said Letters Patent is hereby corrected as shown below:

Col. 10, line 20, delete "Next a" and replace with --Next, a--.

Col. 10, line 27, delete "found then" and replace with --found, then--.

Col. 11, line 5, delete "detector" and replace with --detector;--.

Col. 14, line 5, delete "signals" and replace with --signal--.

Signed and Sealed this

Tenth Day of June, 2008

JON W. DUDAS
*Director of the United States Patent and Trademark Office*